United States Patent [19]

Fukui et al.

[11] Patent Number: 5,505,077
[45] Date of Patent: Apr. 9, 1996

[54] METHOD FOR DETECTING MISFIRING IN AN INTERNAL COMBUSTION ENGINE

[75] Inventors: Wataru Fukui; Toshio Iwata, both of Himeji, Japan

[73] Assignee: Mitsubishi Denki Kabushiki Kaisha, Tokyo, Japan

[21] Appl. No.: 413,629

[22] Filed: Mar. 30, 1995

Related U.S. Application Data

[62] Division of Ser. No. 249,232, May 25, 1994, Pat. No. 5,442,954, which is a division of Ser. No. 49,581, Apr. 21, 1993, Pat. No. 5,351,528, which is a continuation of Ser. No. 734,712, Jul. 23, 1991, abandoned.

[30] Foreign Application Priority Data

Aug. 13, 1990 [JP] Japan ................................ 2-211611
Aug. 23, 1990 [JP] Japan ................................ 2-220039

[51] Int. Cl.⁶ .................................................. G01M 15/00
[52] U.S. Cl. ........................................... 73/115; 73/117.3
[58] Field of Search ............................ 73/116, 117.3, 73/35, 115; 364/431.08

[56] References Cited

U.S. PATENT DOCUMENTS

| | | |
|---|---|---|
| 4,031,747 | 6/1977 | Blanke . |
| 4,366,794 | 1/1983 | Hachiga et al. . |
| 4,596,218 | 6/1986 | Karau et al. . |
| 4,675,821 | 6/1987 | Aoki et al. . |
| 4,819,171 | 4/1989 | Morita . |
| 4,919,099 | 4/1990 | Extance et al. . |
| 5,035,220 | 7/1991 | Uchinami . |
| 5,125,267 | 6/1992 | Kuroda et al. . |
| 5,229,945 | 7/1993 | Demizu et al. . |
| 5,265,575 | 11/1993 | Norota ........................ 123/436 |

FOREIGN PATENT DOCUMENTS

| | | |
|---|---|---|
| 1203016 | 10/1965 | Germany . |
| 127785 | 10/1977 | Germany . |
| 3835285 | 10/1988 | Germany . |
| 4002208 | 1/1990 | Germany . |
| 4023208 | 7/1990 | Germany . |
| 4116518 | 5/1991 | Germany . |
| 4116574 | 5/1991 | Germany . |

OTHER PUBLICATIONS

Plapp et al, "Methods of On-Board Misfire Detection", Bosch GmbH 900232, Mar. 1990.

*Primary Examiner*—Robert Raevis
*Attorney, Agent, or Firm*—Sughrue, Mion, Zinn, Macpeak & Seas

[57] ABSTRACT

Misfiring in an engine cylinder can be detected based on the pressure therein as sensed by a pressure sensor with a high degree of reliability at any time even if the output signal of the pressure sensor contains an offset component superposed on a pressure component representative of the actual cylinder pressure. In one form, the pressure sensor output is differentiated to eliminate the influence of the offset component and then processed to generate a power stroke pressure information signal in the form of the time of a pressure-change peak in the differentiated pressure sensor output or an integrated value of the differentiated output, which is then compared with a threshold so as to determine whether misfiring took place in the cylinder. In another form, the offset component is calculated based on the pressure in the cylinder at two different crank angles during a compression stroke, and it is then removed from the pressure sensor output and compared with a threshold or it may be integrated for a prescribed crank angle range around TDC before comparison with the threshold. In a further form, an expected pressure in the cylinder at a third crank angle during a power stroke is calculated based on the cylinder pressures at first and second crank angles during a compression stroke preceding the power stroke, and then compared with the cylinder pressure as sensed by the pressure sensor at the third crank angle for misfiring determination.

2 Claims, 8 Drawing Sheets

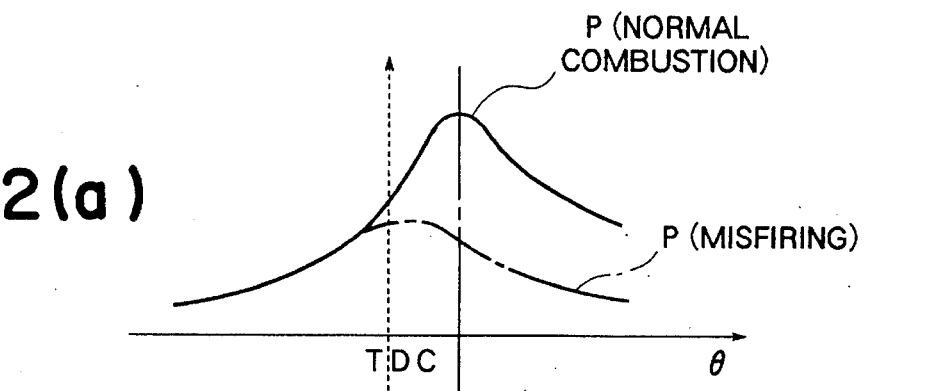
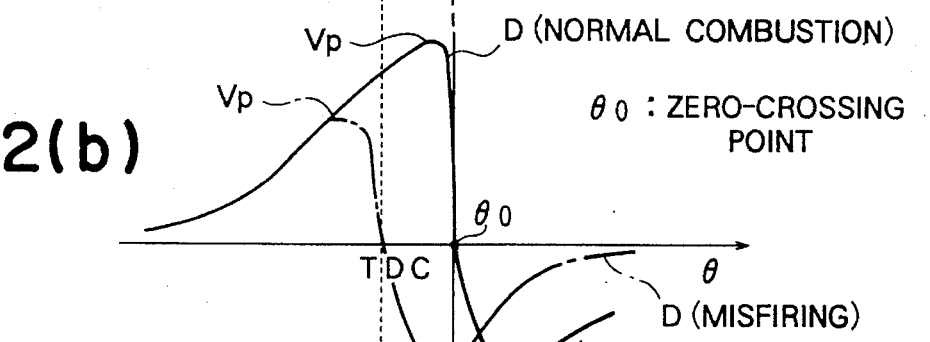
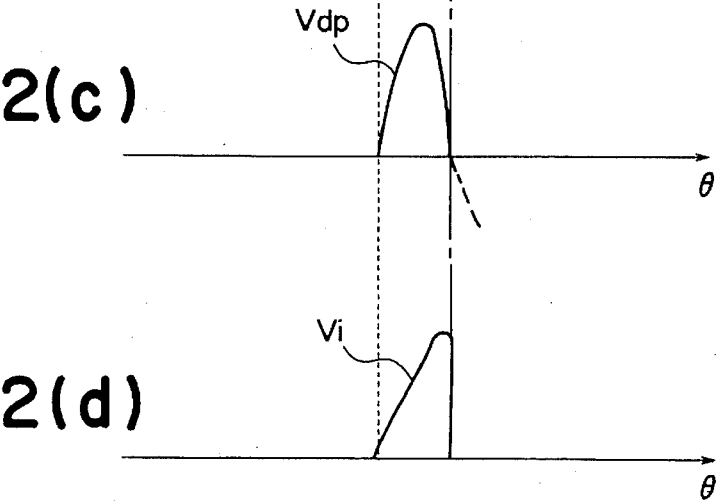

METHOD FOR DETECTING MISFIRING IN AN INTERNAL COMBUSTION ENGINE

This is a divisional of application Ser. No. 08/249,232 filed May 25, 1994, now U.S. Pat. No. 5,442,954, which is a Division of Ser. No. 08/049,581 filed Apr. 21, 1993, now U.S. Pat. No. 5,351,528, which is a Continuation of application Ser. No. 07/734,712, filed Jul. 23, 1991, now abandoned.

BACKGROUND OF THE INVENTION

The present invention relates to a misfiring detecting apparatus and method for an internal combustion engine which can detect misfiring of a cylinder of the engine based on the pressure therein.

In general, internal combustion engines such as an automotive gasoline engine have a plurality (for example four) of cylinders which are operated through four cycles including an intake stroke, a compression stroke, a power stroke and an exhaust stroke. In order to properly control the ignition timings of the cylinders, the order of fuel injection into the cylinders, etc., an engine control unit in the form of a microcomputer is employed for performing various electronic calculations. To this end, based on a cylinder reference position signal representative of the crank positions of the cylinders and a cylinder identification signal which are generated by a signal generator in synchronism with the rotation of the engine, the microcomputer identifies the operating positions of the cylinders and properly controls their operations.

For example, for control of the cylinder ignition, a fuel/air mixture in each cylinder compressed by a piston must be fired for combustion at an optimum timing by a spark generated by a spark plug. In this connection, however, there are times when the mixture in a cylinder, though ignited by a spark plug, does not properly combust depending upon the state of combustion, the condition of the spark plugs, etc. In this situation, an abnormal load is applied to the remaining cylinders, giving rise to a fear of engine damage. Thus, in order to maintain safe engine operation, there is a need to detect, for each ignition cycle of each cylinder, whether the mixture in a cylinder has combusted without fail. For such a purpose, a misfiring detecting apparatus has been proposed which can determine the condition of combustion or misfiring for each cylinder by detecting the pressure therein during the power stroke thereof after an ignition thereof.

FIG. 11 illustrates an internal combustion engine with a typical example of such a known (i.e., conventional but not prior art) misfiring detecting apparatus. In this figure, the engine has a plurality of cylinders 1, only one of which is illustrated for the sake of simplification in description. The cylinder 1 includes a combustion chamber 2 defined therein. A spark plug 3 is mounted on the cylinder head with its electrodes present in the combustion chamber 2. A piston 4 is slidably received in the interior of the cylinder 1 for reciprocating motion therein due to the combustion of an air/fuel mixture in the combustion chamber 2, An intake pipe 5 is connected with the cylinder head for supplying a mixture into the combustion chamber 2 through an intake valve 7, An exhaust pipe 6 is also connected with the cylinder head for discharging exhaust gases from the combustion chamber 2 through an exhaust valve 8.

A fuel injector 9 connected to an unillustrated fuel supply is mounted on the intake pipe 5 for injecting into the intake pipe 5 an amount of fuel which is determined in accordance with the amount of air sucked into the combustion chamber 2 through the intake pipe 7 and an unillustrated throttle valve.

An orifice 2a is formed through the cylinder wall surrounding the combustion chamber 2 for introducing gases in the combustion chamber 2 into a pressure sensor 10 which is mounted on the cylinder wall adjacent the orifice 2 for sensing the pressure in the combustion chamber 2. An ignition coil 11 is connected to a power supply 12 and has a primary winding connected to an igniter 13 and a secondary winding connected to the spark plug 3.

An engine control unit (ECU) 14 in the form of a microcomputer controls the intake valve 7, the exhaust valve 8, the fuel injector 9, the igniter 13, etc. The ECU 14 also operates to detect misfiring in each cylinder 1, and to this end, it receives a crank angle signal from an unillustrated crank angle sensor representative of prescribed crank positions of a piston 4 in each cylinder 1, various signals representative of a variety of aspects of the engine operation, and output signals of the pressure sensors 10 for the respective cylinders 1 representative of the pressures P therein. Though not illustrated, the ECU 14 includes a threshold setter for setting a threshold for determining misfiring in each cylinder 1, and various kinds of calculators for performing a variety of operational calculations. For example, the unillustrated crank angle sensor senses a prescribed crank position of each piston 4 at which there will be a great or significant difference in the pressure in each combustion chamber 2 between the time when combustion takes place and the time when there is misfiring or no combustion. Such a crank position can be set to any arbitrary point between about 10 degrees after top dead center (TDC) and about 90 degrees after TDC.

The operation of the above-described conventional misfiring detecting apparatus will now be described in detail below. As referred to above, four cycles including an intake stroke, a compression stroke, a power stroke and an exhaust stroke are carried out within two reciprocating motions of a piston 4 in each cylinder 1. The ECU 14 controls the amount of fuel injected into the intake pipe 5 by the fuel injector 9 on the intake stroke, the ignition timing of each spark plug 3 and the like in accordance with the operating condition of the engine.

For example, when the intake valve 7 is opened to feed an air/fuel mixture into the combustion chamber 2, the ECU 14 controls the amount of air taken into the intake pipe 5 through the unillustrated throttle valve as well as the amount of fuel injected into the intake pipe 5 by the fuel injector 9 in accordance with the degree of opening of the throttle valve. In addition, the ECU 14 operates to drive the igniter 13 at a prescribed timing after the compression stroke so as to supply a current from the power supply 12 to the ignition coil 11 and cut off the current supply at an appropriate timing. As a result, the spark plug 3 discharges to generate a spark at its electrodes to fire the air/fuel mixture in the combustion chamber 2. Normally, such ignition timing is set to a point near a crank angle of zero degrees or top dead center.

When explosion or combustion of the mixture is caused due to the discharge of the spark plug 3, the pressure P in the combustion chamber 2 as sensed by the pressure sensor 10 sharply rises, but if no explosion or combustion takes place because of misfiring, the pressure P in the combustion chamber 2 remains unchanged or at a low value.

In view of this, the ECU 14 takes in the cylinder pressure P in the combustion chamber 2 as sensed by the pressure sensor 10 at a prescribed timing during each power stroke, generates a misfiring determining threshold, and compares the cylinder pressure P with the threshold. If the cylinder pressure P is less than the threshold, it is determined that there is misfiring in the cylinder, and a misfiring flag for the misfiring cylinder is set up.

In this case, however, if the determination of misfiring is made based solely on the result of such a comparison between the cylinder pressure P and the threshold, there is a probability that the cylinder pressure P sometimes exceeds the threshold due, for example, to an offset component which is generally contained in the output signal from the pressure sensor 10. Accordingly, even in the event that no combustion in effect takes place, it can be determined that there is normal combustion. This may result in engine damage as described above.

Thus, in the above-described conventional misfiring detecting apparatus and method, the state of combustion is determined based on whether or not the cylinder pressure P exceeds the threshold. In this case, however, if the output of the pressure sensor 10 contains, due for example to variations in manufacture, an offset component which is greater than the threshold and which is superposed on a pressure component thereof representative of the actual pressure P in the combustion chamber 2, it is determined that normal combustion takes place in the combustion chamber 2, despite the fact that there is actually misfiring therein. Therefore, in this case, it becomes difficult to detect misfiring with high reliability.

SUMMARY OF THE INVENTION

Accordingly, the present invention is intended to overcome the above-described problems encountered with the conventional misfiring detecting apparatus and method.

It is an object of the invention to provide a novel and improved misfiring detecting apparatus and method which can perform the detection of misfiring with a high degree of reliability at any time even if the output signal of a pressure sensor contains an offset component superposed on a pressure component which is representative of the actual pressure in a cylinder.

In order to achieve the above object, according to one aspect of the invention, there is provided a misfiring detecting apparatus for an internal combustion engine comprising: a pressure sensor for sensing the pressure in a cylinder of the engine and generating a corresponding output signal; a differentiator for differentiating the output signal of the pressure sensor and generating a corresponding output signal; a signal processor for processing the output signal of the differentiator to generate a power stroke pressure information signal; a threshold calculator for calculating a threshold for misfiring determination; a comparator for comparing the power stroke pressure information signal from the signal processor with the threshold from the threshold calculator; and a misfiring determiner for determining, based on the result of the comparison made by the comparator, whether misfiring took place in the cylinder.

In one form, the power stroke pressure information signal is a peak signal representative of a peak in the output signal of the differentiator, and the threshold is a reference value between a high and a low peak which the output signal of the differentiator takes at the times of normal combustion and misfiring, respectively, in the cylinder. The misfiring determiner determines misfiring in the cylinder if the peak signal is lower than or equal to the reference value.

In another form, the power stroke pressure information signal is the differentiated signal from the differentiator in a range from top dead center of a piston in the cylinder to a zero-crossing point at which the output signal of the differentiator crosses a zero point during the power stroke at the time of normal combustion, and the threshold is a zero reference. The misfiring determiner determines misfiring in the cylinder if the differentiated signal is less than or equal to the zero reference.

In a further form, the power stroke pressure information signal is an integrated value of the differentiated signal from the differentiator in a range from top dead center of a piston in the cylinder to a zero-crossing point at which the output signal of the differentiator crosses a zero point during the power stroke at the time of normal combustion, and the threshold is a zero reference. The misfiring determiner determines misfiring in the cylinder if the integrated value is less than or equal to the zero reference.

In a yet further form, the power stroke pressure information signal is a zero-crossing point in the output signal of the differentiator, and the threshold is a reference crank angle at which a piston in the cylinder reaches top dead center. The misfiring determiner determines misfiring in the cylinder if the zero-crossing point in the differentiator output signal is earlier than or equal in time to the reference crank angle.

According to another aspect of the invention, there is provided a misfiring detecting method for detecting misfiring in a cylinder of an internal combustion engine. The method comprises the steps of: sensing the pressure in the cylinder by means of a pressure sensor at a first and a second crank angle during a compression stroke thereof; calculating an offset component contained in an output signal from the pressure sensor based on the pressures in the cylinder as sensed at the first and second crank angles; sensing the pressure in the cylinder by means of the pressure sensor at a third crank angle during a power stroke thereof following the compression stroke; generating a power stroke pressure information signal based on the pressure in the cylinder as sensed by the pressure sensor at the third crank angle and the offset component in the pressure sensor output signal; calculating a threshold suitable for comparison with the power stroke pressure information; comparing the power stroke pressure information signal with the threshold; and determining misfiring in the cylinder if the power stroke pressure information signal is equal or less than the threshold.

According to a further aspect of the invention, there is provided a misfiring detecting method comprising the steps of: sensing the pressure in the cylinder by means of a pressure sensor at a first and a second crank angle during a compression stroke thereof; calculating an offset component contained in an output signal from the pressure sensor based on the pressures in the cylinder as sensed at the first and second crank angles; integrating the pressure in the cylinder as sensed by the pressure sensor in a range from the second crank angle during the compression stroke thereof to a third crank angle during a power stroke thereof following the compression stroke; modifying the integrated cylinder pressure based on the offset component as above calculated to provided a modified integrated cylinder pressure; calculating a threshold suitable for comparison with the integrated cylinder pressure; comparing the modified integrated cylinder pressure with the threshold; and determining misfiring in the cylinder if the modified integrated cylinder pressure is equal or less than the threshold.

According to a yet further aspect of the invention, there is provided a misfiring detecting method comprising the steps of: sensing the pressure in the cylinder by means of a pressure sensor at a first and a second crank angle during a compression stroke thereof; calculating the pressure in the cylinder at a third crank angle during a power stroke thereof following the compression stroke on the basis of the pressure in the cylinder as sensed at the first and second crank angles; sensing the pressure in the cylinder by means of the pressure sensor at the third crank angle; calculating a deviation between the sensed cylinder pressure and the calculated cylinder pressure both at the third crank angle; calculating a threshold suitable for comparison with the deviation; comparing the deviation with the threshold; and determining misfiring in the cylinder if the deviation is equal or less than the threshold.

The above and other objects, features and advantages of the invention will more readily apparent from the following detailed description of a preferred embodiment of the invention taken in conjunction with the accompanying drawings.

BRIEF DESCRIPTION OF THE DRAWINGS

FIGS. 2(a) through 2(d) are waveform diagrams of signals at various parts of the misfiring detecting apparatus of FIG. 1;

DESCRIPTION OF THE PREFERRED EMBODIMENTS

A few preferred embodiments of the present invention will be described in detail while referring to the accompanying drawings.

Figure 1:
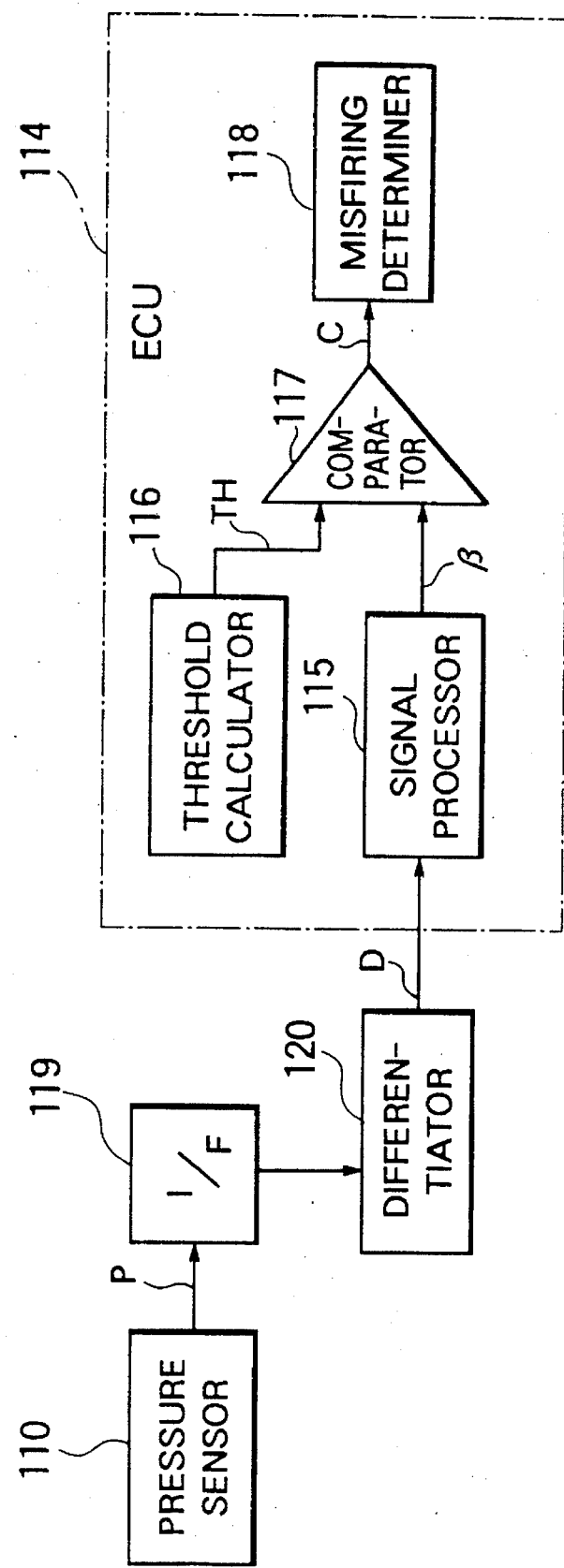
FIG. 1 is a block diagram showing the schematic arrangement of a misfiring detecting apparatus for an internal combustion engine in accordance with the present invention.

Referring first to FIG. 1, there is shown in a block form a misfiring detecting apparatus for an internal combustion engine in accordance with a first embodiment of the invention. In FIG. 1, the apparatus illustrated includes a pressure sensor 110 for sensing the pressure in a combustion chamber in a cylinder of an engine and generating a corresponding output signal P, and an engine control unit (ECU) 114 for controlling the operation of the engine as well as detecting misfiring in the engine based on the output signal P of the pressure sensor 110.

The ECU 114 comprises a signal processor 115 for generating a power stroke pressure information signal β based on the output signal of the pressure sensor 110, a threshold calculator 116 for calculating a threshold TH used for misfiring determination, a comparator 117 for comparing the power stroke pressure information signal β with the threshold TH and generating an output signal C if the power stroke pressure information signal β is greater than the threshold TH, and a misfiring determiner 118 for determining, based on the output signal C from the comparator 117, whether there took place misfiring in a cylinder. Though not illustrated, the ECU 114 further includes an engine operation detector for detecting the operating conditions of the engine on the basis of a crank angle signal representative of prescribed reference crank positions or angles for each cylinder, and various signals from a variety of sensors which sense various aspects of the engine operations such as the number of revolutions per minute of the engine, the engine load, the temperature of intake air, etc. The threshold calculator 116 calculates the threshold TH on the basis of the operating conditions of the engine as detected by the engine operation detector.

A differentiator 120 receives the output signal P from the pressure sensor 110 through an interface 119 and differentiates it to provide a differentiated signal D having a differentiated waveform which is input to the signal processor 115 of the ECU 114.

FIGS. 2(a) and 2(b) show waveforms of the output signal P of the pressure sensor 110 and the output signal D from the differentiator 120, respectively. FIGS. 2(c) and 2(d) show the various waveforms of the output signal β from the signal processor. In these figures, the abscissa represents the crank angle or position of an unillustrated crankshaft; the ordinate the pressure P in a cylinder; TDC top dead center for a piston connected to the crankshaft; $\theta_0$ a zero-crossing point at which the differentiated signal D crosses zero (a point of no change); Vp a peak of the differentiated signal D at the time of normal combustion; Vp' a peak of the differentiated signal D at the time of misfiring; Vdp a positive portion of the differentiated signal D between TDC and $\theta_0$; and Vi an integrated value for the positive differentiated value Vdp.

Figure 3:
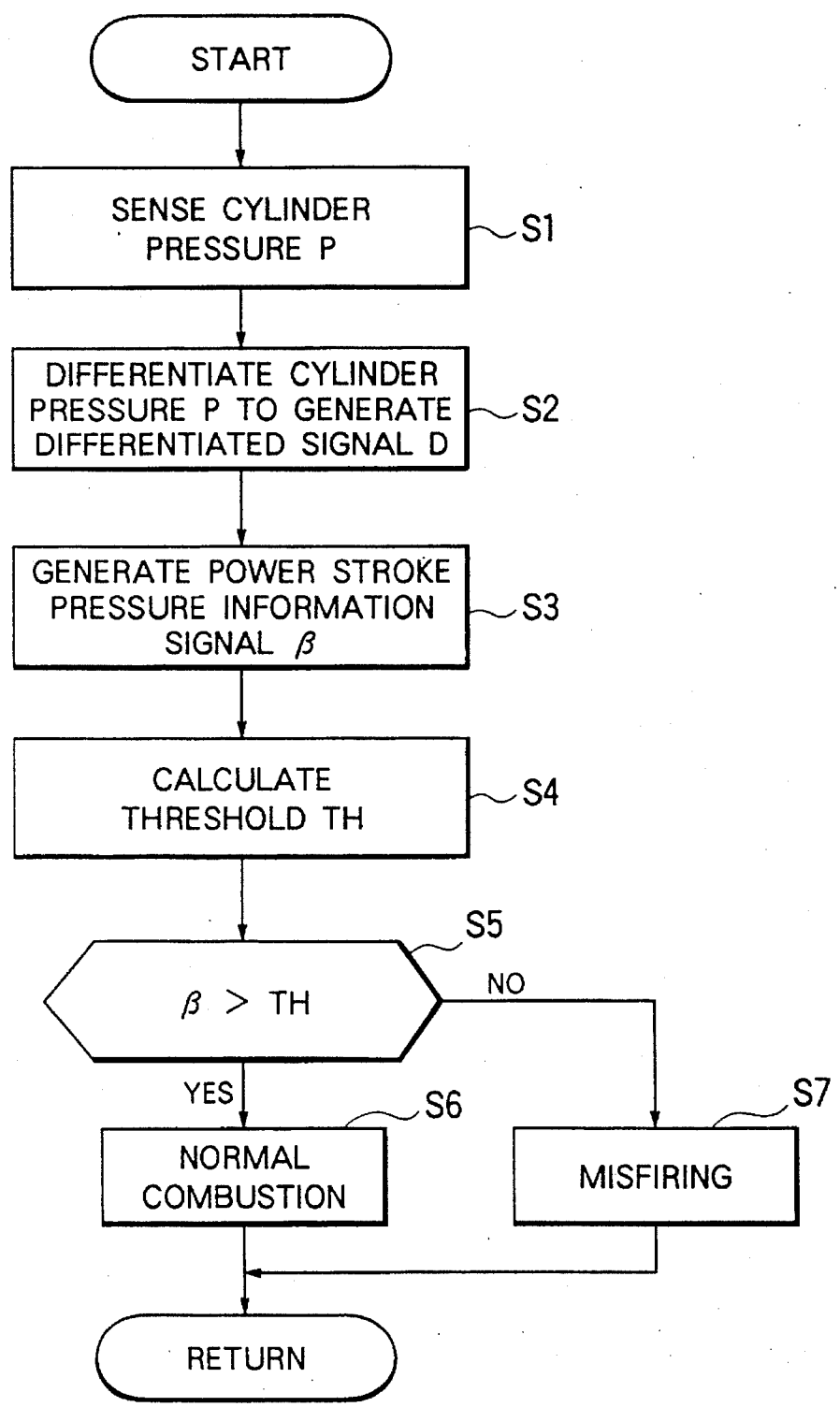
FIG. 3 is a flow chart showing the operation of the apparatus of FIG. 1 in accordance with one form of misfiring detecting method of the invention.

The operation of the above-described apparatus in accordance with one form of misfiring detecting method of the invention will now be described below while referring to the waveform diagrams of FIGS. 2(a) through 2(d) and the flow chart of FIG. 3. Here, let us consider the case in which the misfiring detecting apparatus of FIG. 1 is applied to the internal combustion engine of FIG. 10.

As referred to before, when each cylinder 1 (see FIG. 10) comes into the power stroke subsequent to the compression stroke, the ECU 114 operates to drive the igniter 13 to make the spark plug 3 discharge at a prescribed crank position near TDC.

First, in Step S1, the pressure sensor 110 continuously senses the pressure P in the combustion chamber 2 in each cylinder 1 duping the power stroke as well as during a part of the preceding compression stroke immediately before the ignition of the spark plug 3. The pressure P in the combustion chamber 2 sharply increases to a great value near TDC, as shown by the solid line in FIG. 2(a), if normal combustion or explosion took place in the cylinder 1. If, however, the cylinder 1 was misfiring or no combustion occurred, the cylinder pressure P changes gradually and does not reach a high pressure, as shown by the phantom line in FIG. 2(a). More specifically, in case of normal combustion, the cylinder pressure P sharply rises immediately after TDC, whereas in case of misfiring, there is no such a great change in the pressure P after TDC and it gradually changes in a symmetrical manner with respect to TDC since the volume of the combustion chamber 2 merely changes in accordance with the reciprocating motion of the piston 4 in the cylinder 1.

Subsequently, in Step S2, the differentiator 120 differentiates the output signal P of the pressure sensor 110 input thereto through the interface 119 to provide an output D having a differentiated waveform which is then input to the ECU 114. In this regard, if normal combustion took place, the differentiated signal D changes in a manner as shown by the solid line in FIG. 2(b), and it reaches a great peak Vp immediately after TDC and very sharply or rapidly falls to cross the normal or atmospheric pressure at a crank position of $\theta_0$ after TDC. In contrast, if misfiring took place, the differentiated signal D changes in a manner as shown by the phantom line in FIG. 2(b), and it reaches a small or low peak immediately before TDC and thereafter decreases to cross the normal pressure at TDC.

Taking account of the waveform of the differentiated signal D after TDC, the signal D is positive in a crank angle range between TDC and $\theta_0$ and takes a positive peak value Vp if normal combustion took place, whereas it is negative in the same crank angle range and takes a negative peak value if the cylinder has misfired.

In Step S3, based on the differentiated signal D, the signal processor 115 generates a power stroke pressure information signal $\beta$, which may be any one of the above-mentioned characteristics of the differentiated signal D. That is, the power stroke pressure information signal $\beta$ may be any of the peak value Vp, the zero-crossing point $\theta_0$, the positive portion Vdp of the differentiated signal D between TDC and $\theta_0$, and the integrated signal Vi of the differentiated signal positive portion Vdp.

Thus, even if the output of the pressure sensor 110 contains an offset component of a significant value due, for example, to variations in the operating characteristics thereof, the power stroke pressure information signal $\beta$, which is determined on the basis of the differentiated signal D which is free from any influence from such an offset component, is a highly reliable value exactly reflecting the actual pressure P in the cylinder 1.

On the other hand, in Step S4, based on the operating condition of the engine, the threshold calculator 116 calculates a threshold TH with which the power stroke pressure information signal $\beta$ is compared for determining whether there is misfiring in the cylinder 1. For example, in cases where the number of revolutions per minute of the engine or the engine load is high, the threshold TH is set to a higher value since the power stroke pressure information signal $\beta$ increases with the increasing rpm or engine load.

Subsequently, in Step 5, the comparator 117 compares the power stroke pressure information signal $\beta$ with the threshold TH, and generates an output signal C of a low level indicative of normal combustion if the signal $\beta$ is greater than the threshold TH, and an output signal C of a high level indicative of misfiring if the signal $\beta$ is equal to or less than the threshold TH.

In Steps S6 and S7, based on the output signal C from the comparator 117, the misfiring determiner 118 determines whether normal combustion took place in the cylinder. That is, in Step S6, if the output signal C is high, it is determined that there was normal combustion, whereas in Step S7, if the output signal C is low, it is determined that there was misfiring, and a misfiring flag is set up. Thereafter, a return is performed.

The above Steps S1 through S7 are repeated for each cylinder which is undergoing ignition, so that a misfiring cylinder can be detected immediately. In this case, even if the level of the cylinder pressure P as sensed by the pressure sensor 110 is varied due to an offset component due to variations in the operating characteristics of the pressure sensor 110, the power stroke pressure information signal $\beta$, which is determined based on the differentiated signal D of the pressure sensor output, becomes a stable value free from the influence of such an offset component. Accordingly, erroneous detection of the state of combustion in a cylinder can be prevented, thus ensuring the determination of misfiring with a high degree of reliability at all times.

In addition, the threshold TH is set in dependence upon the characteristics of the power stroke pressure information signal $\beta$ to such a value that can clearly make discrimination between normal combustion and misfiring. For example, if the power stroke pressure information signal $\beta$ takes the form of the peak value of the differentiated signal D, the threshold TH is set to a value between the peak values Vp and Vp' of the differentiated signal D at the times of normal combustion and misfiring, respectively. In addition, if the power stroke pressure information signal $\beta$ takes the form of the positive portion Vdp of the differentiated signal D between TDC and $\theta_0$, or the integrated value Vi of the differentiated signal positive portion Vdp, the threshold TH is set to zero since the positive portion Vdp of the differentiated signal D between TDC and $\theta_0$ and the integrated signal Vi thereof both become zero or negative when there took place misfiring in the cylinder. Accordingly, the difference in theses values between the times of normal combustion and misfiring becomes more distinct, thus enhancing reliability in misfiring determination.

Moreover, the power stroke pressure information signal $\beta$ may take the form of the zero-crossing point $\theta_0$. In this case, the threshold TH is set to the zero-crossing point TDC at the time of misfiring or a point (TDC+$\alpha$) which is later a prescribed angle $\alpha$ from TDC, and in Step S5, it is determined whether the zero-crossing point of the differentiated signal D occurs later than TDC or (TDC+$\alpha$).

Figure 4:
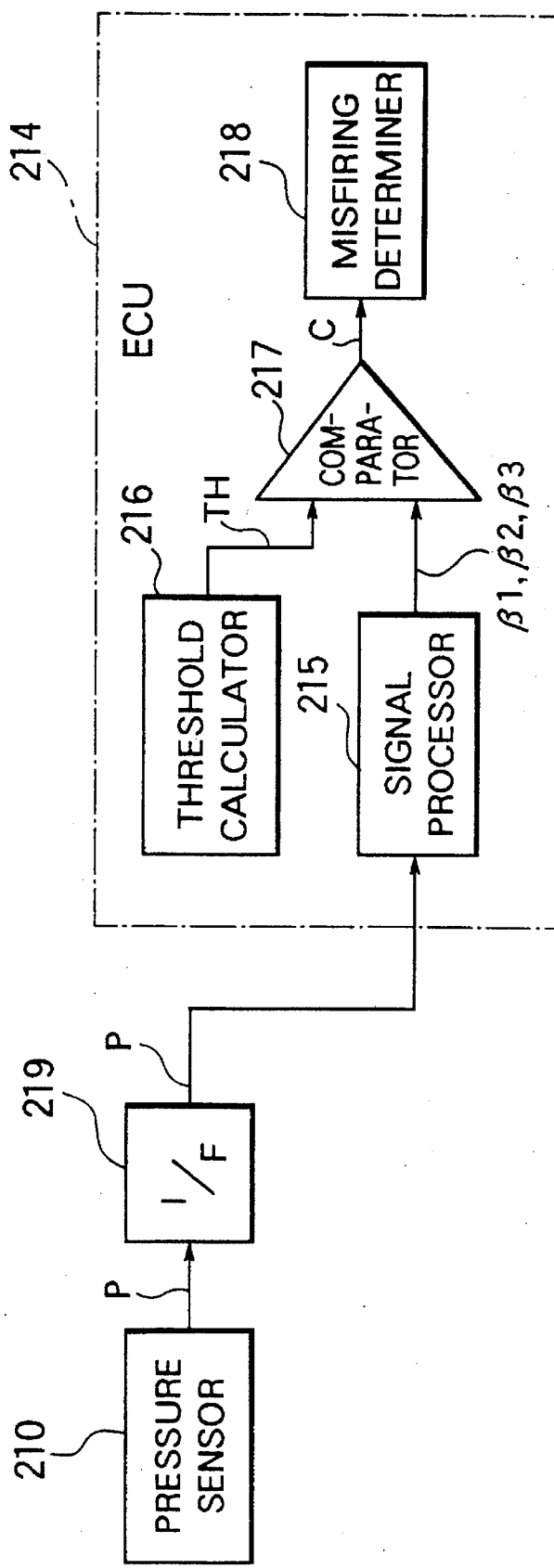
FIG. 4 is a view similar to FIG. 1, but showing a misfiring detecting apparatus in accordance with another embodiment of the invention.

FIG. 4 shows a misfiring detecting apparatus in accordance with another embodiment of the invention which is substantially similar in construction with the FIG. 1 embodiment except for the fact that the differentiator 120 of FIG. 1 is omitted. In this embodiment, a pressure sensor 210 and an interface 219 are the same as the elements 110, 119 of FIG. 1, but the operation of ECU 214 is different from that of the corresponding element 114 of FIG. 1. Specifically, the ECU 214 includes, in addition to a threshold calculator 216, a comparator 217 and a misfiring determiner 218 which are substantially the same as the corresponding elements 116, 117 and 118, respectively, of FIG. 1, a signal processor 215 which is different in operation from the corresponding element 115 of FIG. 1, and which directly receives the output signal P from the pressure sensor 210 through the interface 219 and processes it to generate a power stroke pressure information signal, as will be described in detail below.

Figure 5:
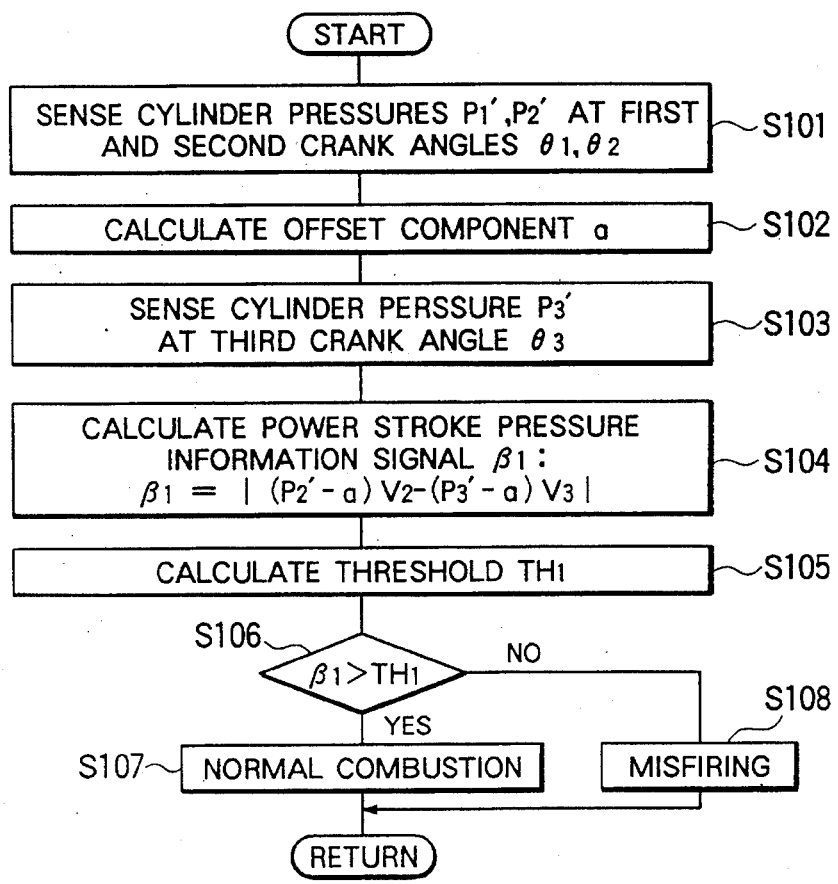
FIG. 5 is a flow chart showing the operation of the apparatus of FIG. 4 in accordance with another form of misfiring detecting method of the invention.
Figure 6:
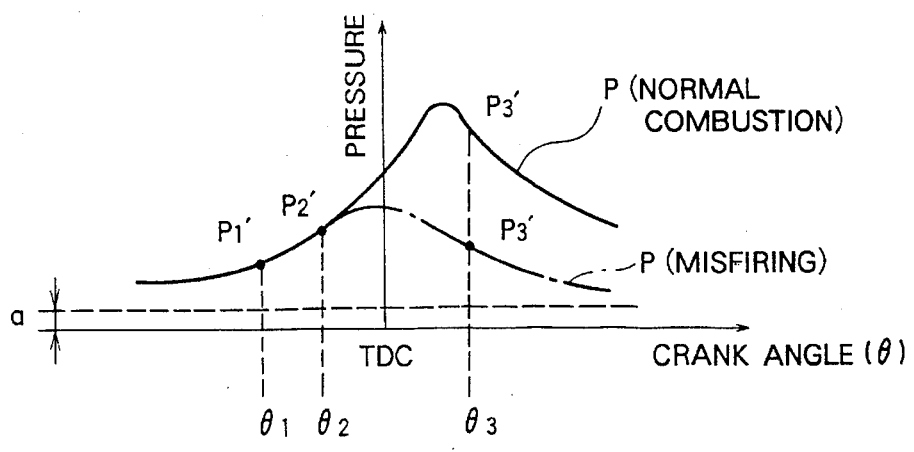
FIG. 6 is a waveform diagram analytically showing respective operational steps performed in the method of FIG. 5.
Figure 11:
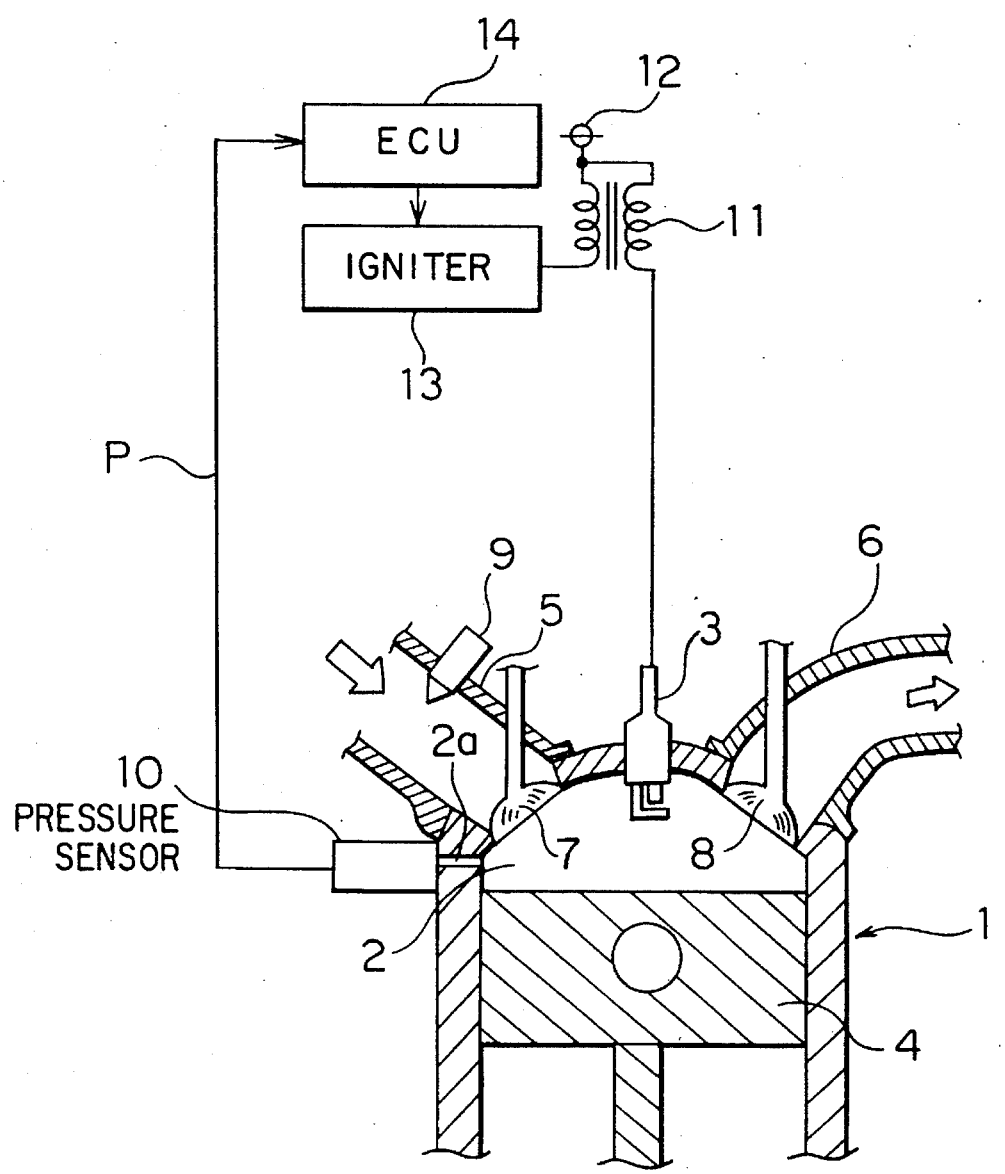
FIG. 11 is a schematic diagram showing a known (i.e., conventional but not prior art) misfiring detecting apparatus for an internal combustion engine.

FIG. 5 shows the operation of the apparatus of FIG. 4 as applied to the internal combustion engine of FIG. 11 in accordance with another form of misfiring detecting method of the invention. FIG. 6 shows the waveform of the output signal P from the pressure sensor 210 in which the abscissa represents the crank angle or position; the ordinate the pressure; α an offset component contained in the pressure sensor output signal P; $\theta_1$ through $\theta_3$ a first through a third prescribed crank angle or position; $P_1'$ through $P_3'$ a first through a third cylinder pressure sensed at $\theta_1'$ through $\theta_3$, respectively; and TDC top dead center for a piston connected to the crankshaft.

As shown in FIG. 5, first in Step S101, a first and a second cylinder pressure $P_1'$, $P_2'$ are sensed by the pressure sensor 210 at prescribed crank positions during each compression stroke preceding an ignition, i.e., at a first angle $\theta_1$ (e.g., 75 degrees before TDC) and a second crank angle $\theta_2$ (e.g., 5 degrees before TDC), respectively.

In Step S102, the signal processor 215 of the ECU 214 calculates an offset component a in the output signal of the pressure sensor 210 on the basis of the first and second cylinder pressures $P_1'$, $P_2'$. Specifically, the first and second pressures $P_1'$, $P_2'$ in the cylinder 1 (FIG. 11) are first calculated based on the volumes $V_1$, $V_2$ of the combustion chamber 2 (FIG. 11) at the first and second crank angles $O_1$, $O_2$ using the Boyle-Sharle's law as follows:

$$(P_1'-\alpha)V_1=(P_2'-\alpha)V_2$$

Thus, $P_1' \times V_1 - P_2' \times V_2 = (V_1-V_2)\alpha$ From this equation, the offset component α is given by the following equation:

$$\alpha=(P_1'\times V_1-P_2'\times V_2)/(V_1-V_2) \qquad (1)$$

Subsequently in Step S103, based on the reference crank angle signal from an unillustrated signal generator representative of prescribed crank positions of the respective cylinders of the engine, the ECU 214 makes the spark plug 3 (FIG. 11) discharge at a prescribed crank angle near TDC, and then the pressure sensor 210 senses the pressure (i.e., a third cylinder pressure $P_3'$) in the combustion chamber 2 at a prescribed crank angle $\theta_3$ (e.g., 30 degrees after TDC ) during the power stroke. In this regard, the third cylinder pressure P3i' thus sensed will be a high or great value, as shown by the solid line in FIG. 6, if there was normal combustion in the cylinder 1, whereas it will be a small or low value, as shown by the phantom line in FIG. 6, if there was misfiring.

In Step S104, on the basis of the offset component α, as given by equation (1) above, and the third cylinder pressure $P_3'$ thus sensed, the signal processor 215 calculates a power stroke pressure information signal $\beta_1$ at the third crank angle $\theta_3$ as follows:

$$\beta_1=|(P_2'-\alpha)V_2-(P_3'-\alpha)V_3| \qquad (2)$$

Here, it is to be noted that the power stroke pressure information signal $\beta_1$ does not include the offset component α and hence it is a value which is unaffected by variations in the output characteristic of the pressure sensor 110 and which exactly reflects the pressure in the combustion chamber 2.

If normal combustion failed to take place due to misfiring, the piston 4 merely reciprocates in the cylinder 1 without any explosion, so the following equation is established:

$$(P_2'-\alpha)V_2=(P_3'-\alpha)V_3 \qquad (3)$$

Thus, in this case, from equation (2) above, $\beta_1$ becomes equal to zero.

On the other hand, if there took place normal combustion in the cylinder, equation (3) above can not be established, and $\beta_1$ becomes greater than zero.

Accordingly, in Step S105, the threshold calculator 216 calculates a threshold $TH_1$ in order to perform accurate determination of normal combustion or misfiring in the cylinder for the power stroke pressure information signal $\beta_1$ thus obtained, and then in Step S106, the comparator 217 compares the signal $\beta_1$ with the threshold $TH_1$ for determining if the signal $\beta_1$ exceeds the threshold $TH_1$.

In Step S107, if the signal $\beta_1$ is greater than the threshold $TH_1$, the misfiring determiner 218 determines that normal combustion took place. If otherwise, it is determined in Step S108 that the cylinder has misfired, and a misfiring flag for the misfiring cylinder is set up.

The above Steps S101 through S108 are repeated at the first through third prescribed crank angles $\theta_1$ through $\theta_3$ so that if there occurred misfiring in a cylinder, such can be immediately detected. In this case, even in the event that the level of the third cylinder pressure $P_3'$ is varied due to the offset component α, there will be no significant change in the power stroke pressure information signal $\beta_1$. Therefore, erroneous detection of the state of combustion in a cylinder can be avoided, thus ensuring highly reliable misfiring detection at all times.

Although in the above embodiment of FIG. 5, the power stroke pressure information signals $\beta_1$ at the first through third crank angles $\theta_1$ through $\theta_3$ are calculated based on the Boyle-Sharle's law, the third one of them may be calculated otherwise. For example, it may be an integrated value of the output signal P of the pressure sensor 210.

Figure 7:
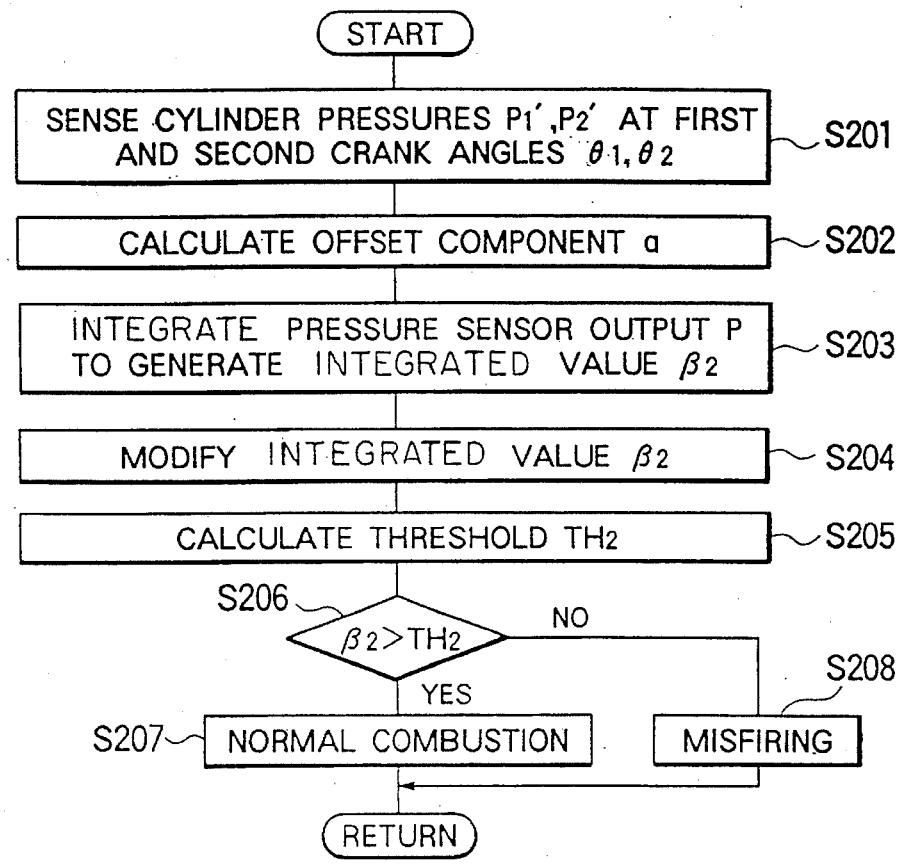
FIG. 7 is a flow chart showing the operation of the apparatus of FIG. 4 in accordance with a further form of misfiring detecting method of the invention.
Figure 8:
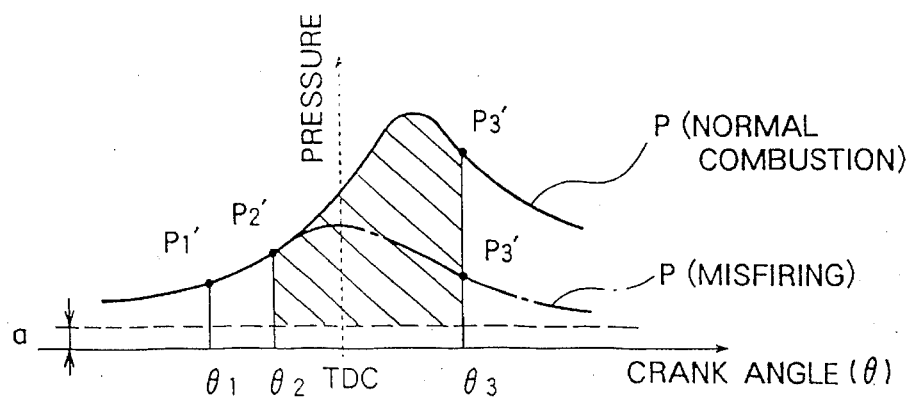
FIG. 8 is a waveform diagram analytically showing respective operational steps performed in the method of FIG. 7.

FIG. 7 shows a further form of misfiring detecting method of the invention as carried out by the apparatus of FIG. 4, in which the power stroke pressure information signal take the form of an integrated value of the output signal from the pressure sensor 210. In this figure, Steps S204 through S206 correspond to Steps S104 through S106, respectively, of FIG. 5 while Steps S201, S202, S207 and S208 are the same as Steps S101, S102, S107 and S108, respectively, of FIG. 5. FIG. 8 is a waveform diagram similar to FIG. 6, analytically illustrating some of Steps of FIG. 7.

In this form of misfiring detecting method, after Steps S201 and S202 in which an offset component α is calculated in the same manner as in Steps S101 and S102 of FIG. 5, then in Step S203, the signal processor 215 integrates the output signal of the pressure sensor 210 representative of the cylinder pressure P within a crank angle range from a second crank angle $\theta_2$ to a third crank angle $\theta_3$ to provide an integrated value $\beta_2$ as follows:

$$\beta_2=\int P(\theta)d\theta$$

In Step 204, the thus calculated integrated value $\beta_2$ is modified based on the offset component α, which is of course given by equation (1) above, using the following formula:

$$\beta_2=\int P(\theta)d\theta-\alpha|\theta_3-\theta_2| \qquad (4)$$

The integrated value $\beta_2$ given by formula (4) above is indicated by an hatched area in FIG. 8 which does not include the offset component α. As clearly can be seen from FIG. 8 in which the solid and phantom lines represent the output signal of the pressure sensor 210 at the times of normal combustion and misfiring, respectively, there is a great difference in the integrated value $\beta_2$ for the output signal D of the pressure sensor 210 between the time of normal combustion and the time of misfiring, so the state of combustion (i.e., normal combustion or misfiring) can be clearly determined on the basis of the integrated value $\beta_2$.

Subsequently in Step S205, the threshold calculator 216 calculates a threshold $TH_2$ for comparison with the integrated value $\beta_2$ based on the operating conditions of the engine. In this connection, when the number of revolutions per minute of the engine or the engine load is high, the level of the integrated value $\beta_2$ becomes greater, so the threshold $TH_2$ is set to a higher value as the engine rpm or the engine load increases.

Then in Step S206, the integrated value $\beta_2$ is compared with the threshold $TH_2$. If $\beta_2 > TH_2$, it is determined in Step S207 that there took place normal combustion in the cylinder, whereas if $\beta_2 \leq TH_2$, it is determined in Step S208 that the cylinder has misfired, and a misfiring flag is set up. Thereafter, a return is performed.

Figure 9:
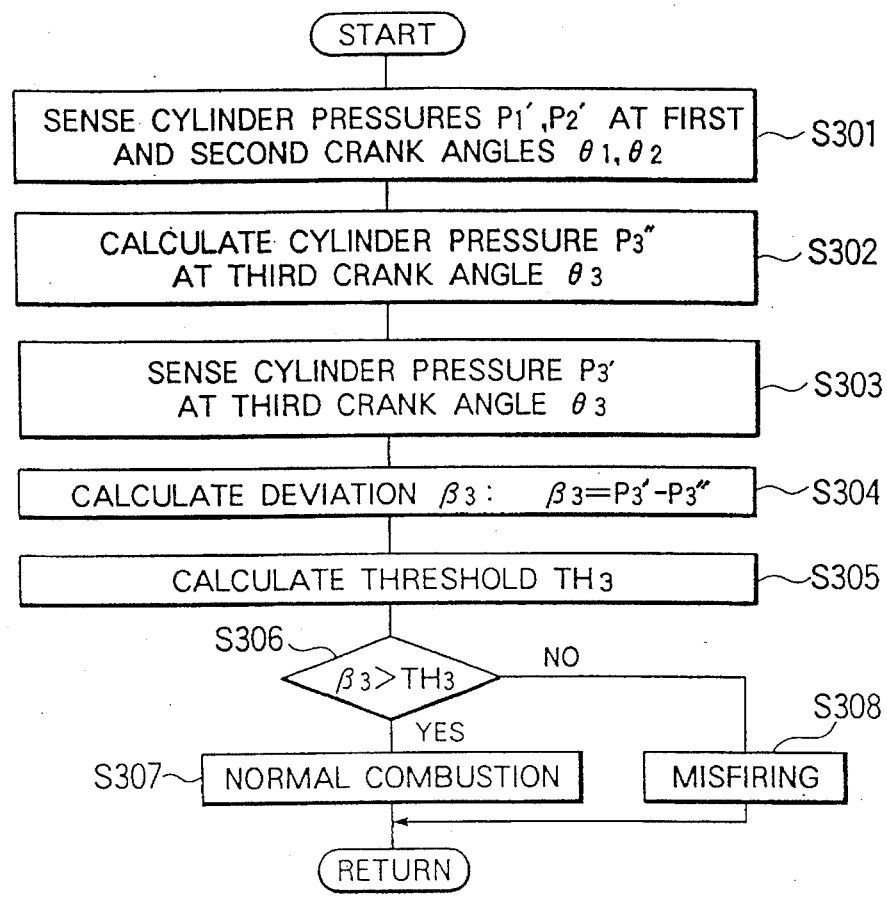
FIG. 9 is a flow chart showing the operation of the apparatus of FIG. 4 in accordance with a yet further form of misfiring detecting method of the invention.
Figure 10:
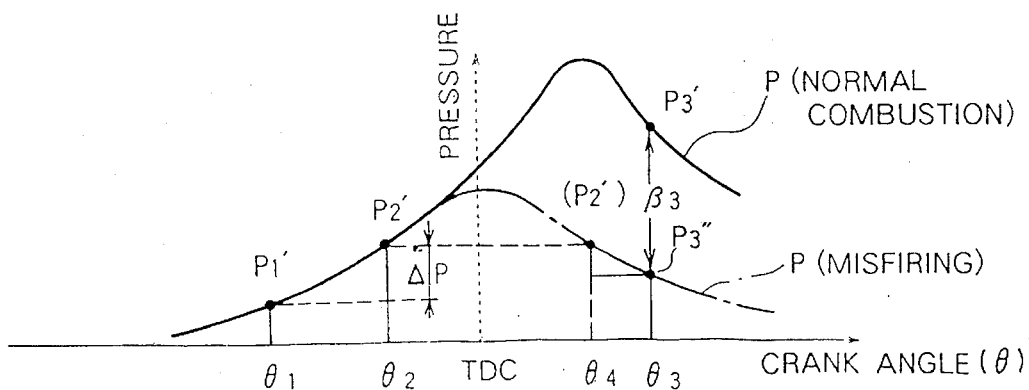
FIG. 10 is a waveform diagram analytically showing respective operational steps performed in the method of FIG. 9.

FIG. 9 shows a yet further form of misfiring detecting method of the invention as performed by the apparatus of FIG. 4. In this figure, Steps 304 through S306 correspond to Steps S104 through S106, respectively, of FIG. 4, while Steps S301, S303, S307 and S308 are the same as Steps S101, S103, S107 and S108, respectively, of FIG. 5. FIG. 10 shows a waveform diagram similar to FIG. 6, but analytically illustrating some of the Steps of FIG. 9.

In this embodiment, first in Steps S301, a first and a second cylinder pressure $P_1'$, $P_2'$ at a first and a second crank angle $\theta_1$, $\theta_2$ are sensed by the pressure sensor 210, and then in Step S302, the signal processor 215 calculates a reference cylinder pressure $P_3''$ at a third crank angle $\theta_3$ based on the thus sensed first and second cylinder pressures $P_1'$, $P_2'$ in the following manner. Specifically, taking account of the fact that the waveform of the output signal from the pressure sensor 210 becomes symmetrical with respect to TDC, as shown by the phantom line in FIG. 10, if misfiring took place, a fourth crank angle $\theta_4$ which is symmetrical to the second crank angle $\theta_2$ with respect to TDC is first determined, and then the reference cylinder pressure $P_3''$ is calculated based on an angular difference or distance between the third crank angle $\theta_3$ and the fourth crank angle $\theta_4$ and a slope of the pressure sensor output between the first crank angle $\theta_1$ and the second crank angle $\theta_2$ through linear interpolation. That is, the reference cylinder pressure $P_3''$ at the third crank angle $\theta_3$ in case of misfiring is given by the following equation:

$$P_3''=P_2'-\Delta P(\theta_4-\theta_3)/(\theta_1-\theta_2)$$

where $\Delta P=P_1'-P_2'$.

Subsequently in Step S303, a third cylinder pressure $P_3'$ is sensed by the pressure sensor 210 at the third crank angle $\theta_3$. Then in Step S304, the signal processor 215 calculates a deviation $\beta_3$ between $P_3''$ and $P_3'$ as follows:

$$\beta_3=P_3'-P_3'' \qquad (5)$$

As seen from equation (5) above, the deviation $\beta_3$ thus obtained has nothing to do with the offset component $\alpha$ and hence it is a power stroke pressure information signal free from the offset component $\alpha$.

In Step S305, a threshold $TH_3$ for comparison with the deviation $\beta_3$ is calculated, and in Step S306, the deviation $\beta_3$ is compared with the threshold $TH_3$. If $\beta_3 > TH_3$, in Step S307 it is determined that there was normal combustion in the cylinder, whereas if $\beta_3 \leq TH_3$, it is determined in Step S308 that there was misfiring in the cylinder, and a misfiring flag is set up. Thereafter, a return is carried out.

What is claimed is:

1. A misfiring detecting method for detecting misfiring in a cylinder of an internal combustion engine, said method comprising the steps of:

sensing the pressure in the cylinder by means of a pressure sensor at a first and a second crank angle during a compression stroke thereof;

calculating an offset component contained in an output signal from the pressure sensor based on the pressures in the cylinder as sensed at the first and second crank angles;

sensing the pressure in the cylinder by means of the pressure sensor at a third crank angle during a power stroke thereof following the compression stroke;

generating a power stroke pressure information signal based on the pressure in the cylinder as sensed by the pressure sensor at the third crank angle and the offset component in the pressure sensor output signal;

calculating a threshold suitable for comparison with the power stroke pressure information;

comparing the power stroke pressure information signal with the threshold; and determining misfiring in the cylinder if the power stroke pressure information signal is equal or less than the threshold.

2. A misfiring detecting method according to claim 1, wherein the power stroke pressure information signal $\beta$ is calculated as follows:

$$\beta=(P_2'-\alpha)V_2-(P_3'-\alpha)V_3$$

where $\alpha$ is the offset component; $P_2'$ is the cylinder pressure as sensed at the second crank angle; $P_3'$ is the cylinder pressure as sensed at the third crank angle; $V_2$ is the volume of a combustion chamber in the cylinder at the second crank angle; and $V_3$ is the volume of the combustion chamber in the cylinder at the third crank angle.

* * * * *